US010929822B2

(12) United States Patent
Clark et al.

(10) Patent No.: US 10,929,822 B2
(45) Date of Patent: Feb. 23, 2021

(54) GRAPHICAL USER INTERFACES FOR FACILITATING END-TO-END TRANSACTIONS ON COMPUTING DEVICES

(71) Applicant: CAPITAL ONE SERVICES, LLC, McLean, VA (US)

(72) Inventors: Yumi Clark, Los Altos, CA (US); Samuel Wolfand, San Francisco, CA (US); Srinivas Nookala, Fremont, CA (US); Mychilo Cline, Walnut Creek, CA (US); David Norman, Fremont, CA (US); Larry Damman, Melvindale, MI (US); Hashaam Markas, Allen, TX (US); Adam Zedler, Oakland, CA (US); Sasikiran Myadam, San Francisco, CA (US); Dennis Brennan, Pleasanton, CA (US); David Dao, Silver Spring, MD (US)

(73) Assignee: Capital One Services, LLC, McLean, VA (US)

(*) Notice: Subject to any disclaimer, the term of this patent is extended or adjusted under 35 U.S.C. 154(b) by 184 days.

(21) Appl. No.: 15/368,223

(22) Filed: Dec. 2, 2016

(65) Prior Publication Data
US 2017/0161697 A1    Jun. 8, 2017

Related U.S. Application Data

(60) Provisional application No. 62/262,693, filed on Dec. 3, 2015.

(51) Int. Cl.
*G06Q 20/10* (2012.01)
*G06Q 30/04* (2012.01)
(Continued)

(52) U.S. Cl.
CPC .......... *G06Q 20/102* (2013.01); *G06Q 20/32* (2013.01); *G06Q 30/04* (2013.01); *G06F 3/0481* (2013.01)

(58) Field of Classification Search
CPC ..... G06Q 20/102; G06Q 30/04; G06F 3/0481
See application file for complete search history.

(56) References Cited

U.S. PATENT DOCUMENTS

| 2004/0148228 A1* | 7/2004 | Kwei | G06Q 30/0623 705/26.4 |
| 2010/0082481 A1* | 4/2010 | Lin | G06Q 20/042 705/41 |

(Continued)

*Primary Examiner* — Florian M Zeender
*Assistant Examiner* — Vanessa Deligi
(74) *Attorney, Agent, or Firm* — Pillsbury Winthrop Shaw Pittman LLP

(57) ABSTRACT

Methods and systems for facilitating group payment are disclosed. In one embodiment, a group payment system is configured to execute instructions to perform operations that include receiving, from a first computing device, a request to create a group payment event and, in response, providing to the first computing device a first interface associated with the group payment event. The operations further include receiving, from a second computing device, a request to join the group payment event and, in response, providing a second interface to the second computing device. The operations further include receiving, from the first and/or second computing devices, messages associated with the group payment event and modifying the first and second interfaces to display the messages. The operations further include receiving, from the first and/or second computing devices, financial contributions for the group payment event and modifying the first and second interfaces to display the financial contributions.

18 Claims, 16 Drawing Sheets

(51) Int. Cl.
*G06Q 20/32* (2012.01)
*G06F 3/0481* (2013.01)

(56) References Cited

U.S. PATENT DOCUMENTS

| | | | | |
|---|---|---|---|---|
| 2012/0150731 A1* | 6/2012 | Isaacson | ................ | G06Q 50/01 |
| | | | | 705/39 |
| 2012/0173396 A1* | 7/2012 | Melby | .................... | G06Q 30/04 |
| | | | | 705/34 |
| 2014/0108235 A1* | 4/2014 | Chelst | .................. | G06Q 20/227 |
| | | | | 705/39 |
| 2015/0310408 A1* | 10/2015 | Anderson | ............... | G06Q 20/32 |
| | | | | 705/39 |
| 2016/0117651 A1* | 4/2016 | Davis | .................... | G06Q 20/10 |
| | | | | 705/40 |
| 2016/0267448 A1* | 9/2016 | James | ................ | G06Q 20/102 |
| 2017/0185989 A1* | 6/2017 | Bozovich, Jr. | ....... | G06F 16/9566 |

\* cited by examiner

GRAPHICAL USER INTERFACES FOR FACILITATING END-TO-END TRANSACTIONS ON COMPUTING DEVICES

This application claims priority to U.S. Provisional Patent Application No. 62/262,693 filed Dec. 3, 2015, the contents of which are hereby incorporated in their entirety.

BACKGROUND

Existing applications available on computing devices permit users to exchange payment. For example, applications such as PayPal™ and Google Wallet™ are configured to provide graphical user interfaces through which a user can make a payment to or request a payment from another user. However, existing graphical user interfaces on mobile devices are inflexible and unable to adapt to subsequent changes in a user's payment or request for payment. Moreover, existing applications on computing devices are ill-equipped to facilitate payment among multiple users. Lastly, existing applications graphical user interfaces on mobile devices are unable to provide graphical user interfaces through which, in addition to making and requesting payment, multiple users may engage in discussion regarding such payments. Accordingly, mobile applications offering improved graphical user interfaces are desired.

SUMMARY

The disclosed embodiments may include systems and methods for facilitating group payment.

In one embodiment, a group payment system is disclosed. The group payment system may comprise a communication device configured to communicate with a plurality of computing devices, a memory storing instructions, and a processor configured to execute the instructions to perform operations. The operations may comprise receiving, from a first computing device in the plurality of computing devices, a request to create a group payment event and, in response to receiving the request to create the group payment event, providing to the first computing device a first interface associated with the group payment event. The operations may further comprise receiving, from at least a second computing device in the plurality of computing devices, a request to join the group payment event and, in response to receiving the request to join the group payment event, providing a second interface to at least the second computing device. The operations may further comprise receiving, from at least one of the first computing device and the second computing device, a plurality of messages associated with the group payment event and, in response to receiving each message in the plurality of messages, modifying the first interface and second interface to display the message. The operations may still further comprise receiving, from at least one of the first computing device and the second computing device, a specification of financial contributions for the group payment event and, in response to receiving the specification of the financial contributions, modifying the first interface and second interface to display the specification of the financial contributions.

In another embodiment, a method is disclosed. The method may comprise receiving, from a first computing device in the plurality of computing devices, a request to create a group payment event and, in response to receiving the request to create the group payment event, providing to the first computing device a first interface associated with the group payment event. The method may further comprise receiving, from at least a second computing device in the plurality of computing devices, a request to join the group payment event and, in response to receiving the request to join the group payment event, providing a second interface to at least the second computing device. The method may further comprise receiving, from at least one of the first computing device and the second computing device, a plurality of messages associated with the group payment event and, in response to receiving each message in the plurality of messages, modifying the first interface and second interface to display the message. The method may still further comprise receiving, from at least one of the first computing device and the second computing device, a specification of financial contributions for the group payment event and, in response to receiving the specification of the financial contributions, modifying the first interface and second interface to display the specification of the financial contributions.

In another embodiment, a computing device is disclosed. The computing device may comprise a communication device configured to communicate with a group payment system, an input device, a display device, a memory storing instructions, and a processor configured to execute the instructions to perform operations. The operations may comprise receiving, via the input device, a request to create a group payment event, electronically transmitting the request to the group payment system, and receiving from the group payment system an interface associated with the group payment event for display on the displaying device. The operations may further comprise receiving, via the input device, a first message associated with the group payment event, electronically transmitting the first message to the group payment system and modifying the interface to display the first message, and receiving from the group payment system a second message and modifying the interface to display the second message. The operations may further comprise receiving, via the input device, a specification of financial contributions for the group payment event and, in response to receiving the specification of the financial contributions, electronically transmitting the specification of the financial contributions to the group payment system and modifying the interface to display the specification of the financial contributions.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings.

Disclosed are graphical user interfaces that permit multiple users to flexibly discuss, coordinate, and continually revise payment arrangements among the users. Unlike existing graphical user interfaces, which are inflexible and unable to adapt to subsequent changes in a user's payment or request for payment, the disclosed graphical user interfaces are configured to be updated to reflect subsequent purchase transactions, changed financial contributions, and/or other information impacting payments and/or requests for payment among users. Moreover, whereas existing applications on computing devices are ill-equipped to facilitate payment among multiple users, the disclosed graphical user interfaces are configured to be provided to multiple computing devices, permitting multiple users to record purchase transactions, change financial contributions, and make or request payments. Lastly, while existing applications graphical user interfaces are unable to provide graphical user interfaces through which, in addition to making and requesting payment, multiple users may engage in discussion regarding such payments, the disclosed graphical user interfaces are configured to interface with multiple computing devices to receive messages in order to update the graphical user interfaces to reflect messages from multiple users.

Figure 1:
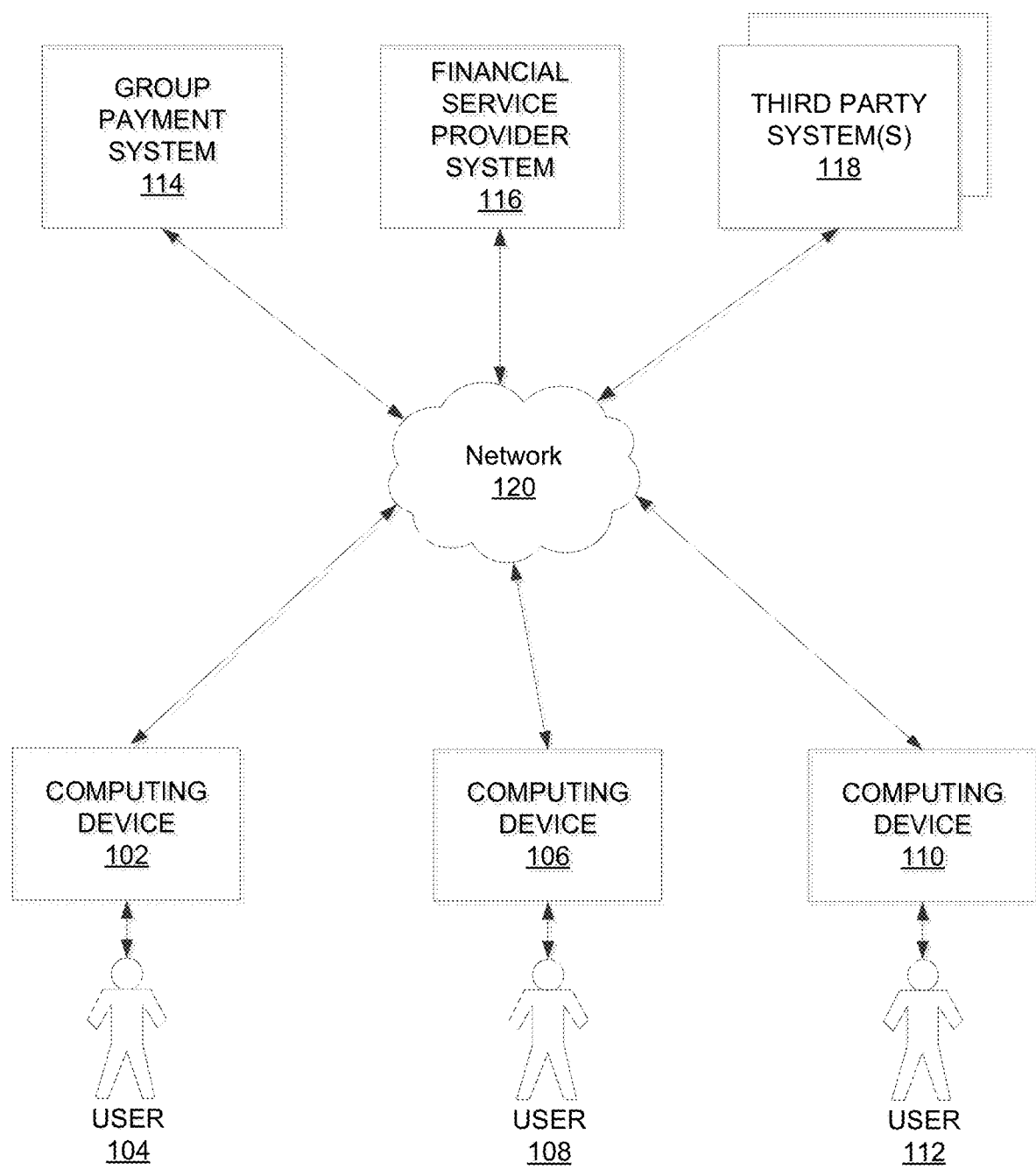
FIG. 1 is a block diagram of an exemplary system, consistent with disclosed embodiments.

FIG. 1 is a block diagram of an exemplary system 100, consistent with disclosed embodiments. In particular, system 100 may be configured for performing one or more operations consistent with the disclosed embodiments. In one embodiment, system 100 may include a computing device 102 associated with a user 104, a computing device 106 associated with a user 108, a computing device 110 associated with a user 112, a group payment system 114, a financial service provider (FSP) system 116, and third-party system(s) 118, all of which may be communicatively coupled by a network 120.

While three computing devices 102, 106, 110 and users 104, 108, 112 are shown, it will be understood that system 100 may include more or fewer computing devices. Further, while only group payment system 114, FSP system 116, and network 120 are shown, it will be understood that system 100 may include more than one of any of these components. Still further, while multiple third-party systems 118 are shown, it will be understood that system 100 may include only one third-party system 118 as well. The components and arrangement of the components included in system 100 may vary. Thus, system 100 may include other components that perform or assist in the performance of one or more processes consistent with the disclosed embodiments.

Group payment system 114 may be configured to facilitate a group payment event for users 104, 108, and 112. To this end, users 104, 108, and 112 may access group payment system 114 using their respective computing devices 102, 106, and 110. For example, computing devices 102, 106, and 110 may be configured to execute a mobile application provided by group payment system 114. Group payment system 114 may facilitate the group payment event by, for example, providing particular interfaces to computing devices 102, 106, and 110, thereby enabling users 104, 108, and 112 to create the group payment event, invite others to join the group payment event, discuss the group payment event, and/or specify respective financial contributions for the group payment event. Group payment system 114 may facilitate the group payment event in other manners as well, as discussed below. Group payment system 114 is further described below in connection with FIG. 2. Computing devices 102, 106, and 110 are further described below in connection with FIG. 3.

As shown, computing devices 102, 106, and 110 and group payment system 114 may be communicatively coupled to FSP system 116 over network 120. FSP system 116 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art. Financial service accounts may be associated with one or more currencies, digital assets (e.g., Bitcoin™), and/or any other type of financial currency.

FSP system 116 may be one or more computing devices configured to perform one or more operations consistent with maintaining financial service accounts, including a financial service account associated with users 104, 108, and/or 112. FSP system 116 may be further configured to generate content for a display device included in, or connected to, computing devices 102, 106, and/or 110. For example, FSP system 116 may provide content through a mobile banking application on computing devices 102, 106, and/or 110. Alternatively or additionally, FSP system 116 may provide content through one or more web sites or online portals that are accessible by computing devices 102, 106, and/or 110 over network 120. FSP system 116 may be one or more computing devices further configured to authenticate financial transactions associated with financial service accounts. In particular, FSP system 116 may be configured to authenticate financial transactions associated with users' 104, 108, and/or 112 financial service account(s). The disclosed embodiments are not limited to any particular configuration of FSP system 116.

As shown, computing devices 102, 106, and 110 and group payment system 114 may additionally be communicatively coupled to one or more third-party system(s) 118 over network 120. Third-party systems 118 may include one or more computing systems configured to perform one or more operations consistent with facilitating electronic payment between users 104, 108, and/or 112. To this end, third-party systems 118 may be configured to execute instructions to perform one or more processes facilitating the electronic transfer of funds between financial service accounts associated with users 104, 108, and/or 112. This may occur as a direct transfer (within the same institution) or a Wire Transfer. In some embodiments, the third-party system(s) 118 may include a system similar to, for example, PayPal™, Google Wallet™, Dwolla™, or blockchain. Alternatively or in addition, a "bill pay" account may be used to transfer money via ACH or a paper check. Still alternatively or in addition, third-party system(s) 118 may facilitate payment using one or more electronic tokens, e.g., information items that point to financial service accounts without using highly sensitive account information. Third-party system(s) 118 may take other forms as well, and the disclosed embodiments are not limited to any particular configuration of third-party system(s) 118.

While group payment system 114, FSP system 116, and third-party system(s) 118 are shown separately, in some embodiments group payment system 114 may include or be otherwise related to one or both of FSP system 116 and third-party system(s) 118. For example, in some embodiments the facility of third-party system(s) 118 may be provided instead by one or both of group payment system 114 and FSP system 116. As another example, in some embodiments the facility of both FSP system 116 and third-party system(s) 118 may be provided by group payment system 114. Other examples are possible as well.

Network 120 may be any type of network configured to provide communication between components of system 100. For example, network 120 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
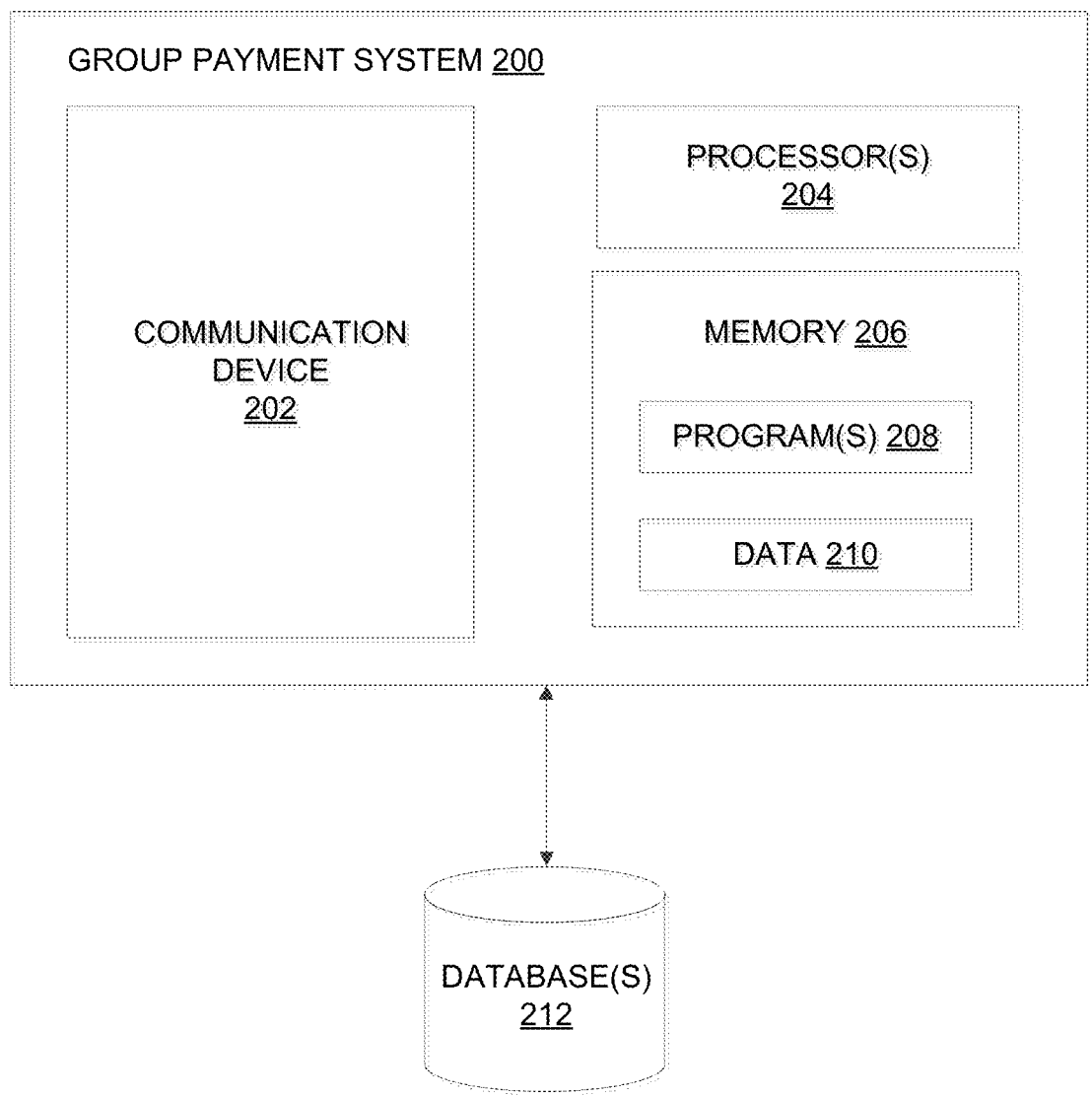
FIG. 2 is a block diagram of an exemplary group payment system, consistent with disclosed embodiments.

FIG. 2 is a block diagram of an exemplary group payment system 200, consistent with disclosed embodiments. As shown, group payment system 200 may include a communication device 202, one or more processor(s) 204, and a memory 206 including one or more programs 208 and data 210.

In some embodiments, group payment system 200 may take the form of a server, general purpose computer, mainframe computer, or any combination of these components. Other implementations consistent with disclosed embodiments are possible as well.

Communication device 202 may be configured to communicate with one or more computing devices, such as computing devices 102, 106, and 110 described above. In some embodiments, communication device 202 may be configured to communicate with one or more FSP systems, such as FSP system 116 described above, and/or third-party system(s), such as third-party system(s) 118 described above. Communication device 202 may be configured to communicate with other components as well.

Communication device 202 may be configured to provide communication over a network, such as network 120 described above. To this end, communication device 202 may include, for example, one or more digital and/or analog devices that allow group payment system 200 to communicate with and/or detect other components, such as a network controller and/or wireless adaptor for communicating over the Internet. Other implementations consistent with disclosed embodiments are possible as well.

Processor(s) 204 may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of group payment system 200.

Memory 206 may include one or more storage devices configured to store instructions used by processor(s) 204 to perform functions related to disclosed embodiments. For example, memory 206 may be configured with one or more software instructions, such as program(s) 208, that may perform one or more operations when executed by processor(s) 204. The disclosed embodiments are not limited to separate programs or computers configured to perform dedicated tasks. For example, memory 206 may include a single program 208 that performs the functions of group payment system 200, or a plurality of program 208. Memory 206 may also store data 210 that is used by program(s) 208.

In certain embodiments, memory 206 may store sets of instructions for carrying out the processes described below in connection with FIG. 4. Other instructions are possible as well. In general, instructions may be executed by processor(s) 204 to perform one or more processes consistent with disclosed embodiments.

The components of group payment system 200 may be implemented in hardware, software, or a combination of both hardware and software, as will be apparent to those skilled in the art. For example, although one or more components of group payment system 200 may be implemented as computer processing instructions, all or a portion of the functionality of group payment system 200 may be implemented instead in dedicated electronics hardware.

Group payment system 200 may also be communicatively connected to one or more database(s) 212. In one aspect, group payment system 200 may include database(s) 212. Alternatively, database(s) 212 may be located remotely from group payment system 200. Group payment system 200 may be communicatively connected to database(s) 212 through a network, such as network 120 described above. Database(s) 212 may include one or more memory devices that store information and are accessed and/or managed through group payment system 200. By way of example, database(s) 212 may include Oracle™ databases, Sybase™ databases, or other relational databases or non-relational databases, such as Hadoop® sequence files, HBase™, or Cassandra™. Database(s) 212 may include computing components (e.g., database management system, database server, etc.) configured to receive and process requests for data stored in memory devices of database(s) 212 and to provide data from database(s) 212.

Figure 3:
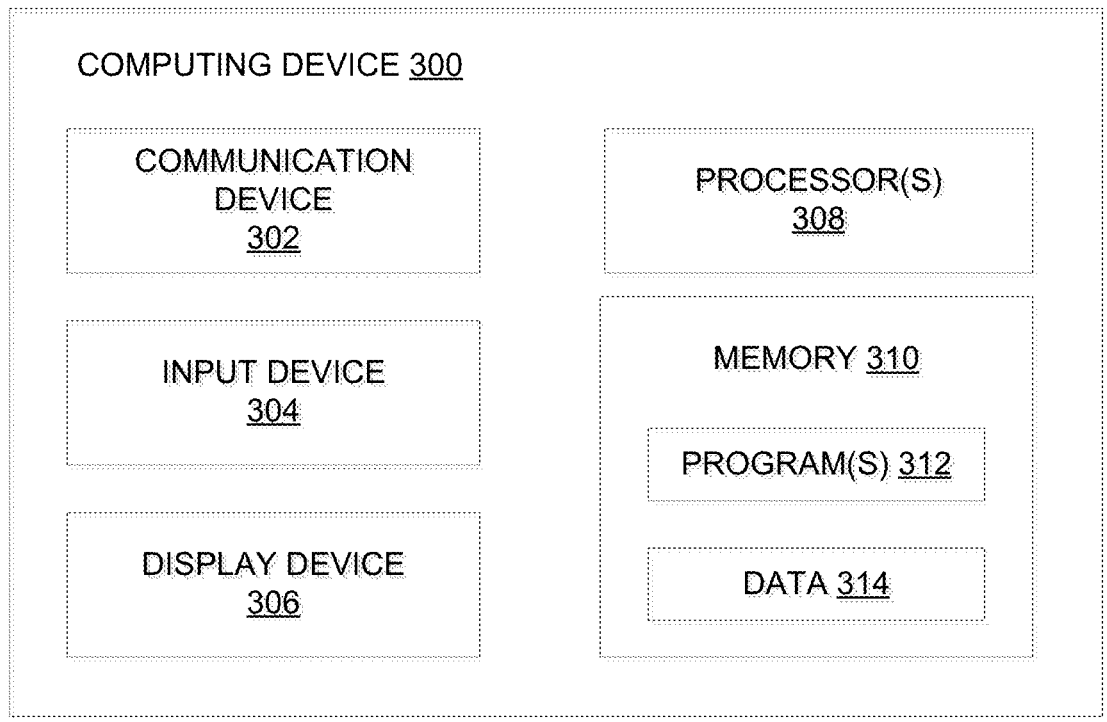
FIG. 3 is a block diagram of an exemplary computing device, consistent with disclosed embodiments.

FIG. 3 is a block diagram of an exemplary computing device 300, consistent with disclosed embodiments. As shown, computing device 300 includes a communication device 302, an input device 304, a display 306, processor(s) 308, and a memory 310 including program(s) 312 and data 314.

In some embodiments, computing device 300 may take the form of a mobile computing device, such as a smartphone, tablet, laptop computer, or any combination of these components. Alternatively, computing device 300 may be configured as any wearable item, including jewelry, smart glasses, or any other device suitable for carrying or wearing on a customer's person. Still alternatively, computing device 300 may be configured as a desktop computer. Other implementations consistent with disclosed embodiments are possible as well.

Communication device 302 may be configured to communicate with a group payment system, such as group payment systems 114 and 200 described above. In some embodiments, communication device 302 may be further configured to communicate with one or more FSP systems, such as FSP system 116 described above, and/or third-party system(s), such as third-party system(s) 118 described above. Communication device 302 may be configured to communicate with other components as well.

Communication device 302 may be configured to provide communication over a network, such as network 120 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Input device 304 may be configured to receive input from a user. In particular, input device 304 may be configured to receive one or more of requests to create group payment events, messages associated with group payment events, and specifications of financial contributions for group payment events. Input device 304 may be configured to receive other information as well. Input device 304 may take the form of, for example, a touch-sensitive area, a keyboard, buttons, or microphones. Other input devices are possible as well. The disclosed embodiments are not limited to any type of input devices otherwise configured to receive input from a user.

Display device 306 may be any display device configured to display interfaces on computing device 300. In some embodiments, display device 306 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 306 may also include one or more digital and/or analog devices that allow a user to interact with computing device 300, such as a touch-sensitive area, a keyboard, buttons, or microphones. In some embodiments, display device 306 may be implemented together with input device 304. Other display devices are possible as well. The disclosed embodiments are not limited to any type of display devices otherwise configured to display interfaces.

Processor(s) 308 may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 308 may also include various architectures (e.g., x86 processor, ARM®, etc.). The disclosed embodiments are not limited to any type of processor(s) otherwise configured to meet the computing demands required of different components of computing device 300.

Memory 310 may include one or more storage devices configured to store instructions used by processor(s) 308 to perform functions related to disclosed embodiments. For example, memory 310 may be configured with one or more software instructions, such as program(s) 312, that may perform one or more operations when executed by processor(s) 308. The disclosed embodiments are not limited to separate programs or computers configured to perform dedicated tasks. For example, memory 310 may include a single program 312 that performs the functions of computing device 300, or program(s) 312 may comprise multiple programs. Memory 310 may also store data 314 that is used by program(s) 312.

In certain embodiments, memory 310 may store sets of instructions for carrying out the processes described below in connection with FIG. 5. Further, in some embodiments, memory 310 may store instructions for executing one or more mobile applications. The mobile applications may include, for example, a group payment application that provides group payment services offered by a group payment server, such as group payment servers 114 and 200 described above. The mobile applications may further include, for example, a mobile banking application for providing financial service-related functions offered by an FSP system, such as FSP system 116. These functions may include, for instance, checking balances, paying bills, performing financial transactions, budgeting, receiving marketing messages, etc. Other mobile applications are possible as well. In general, instructions may be executed by processor(s) 308 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
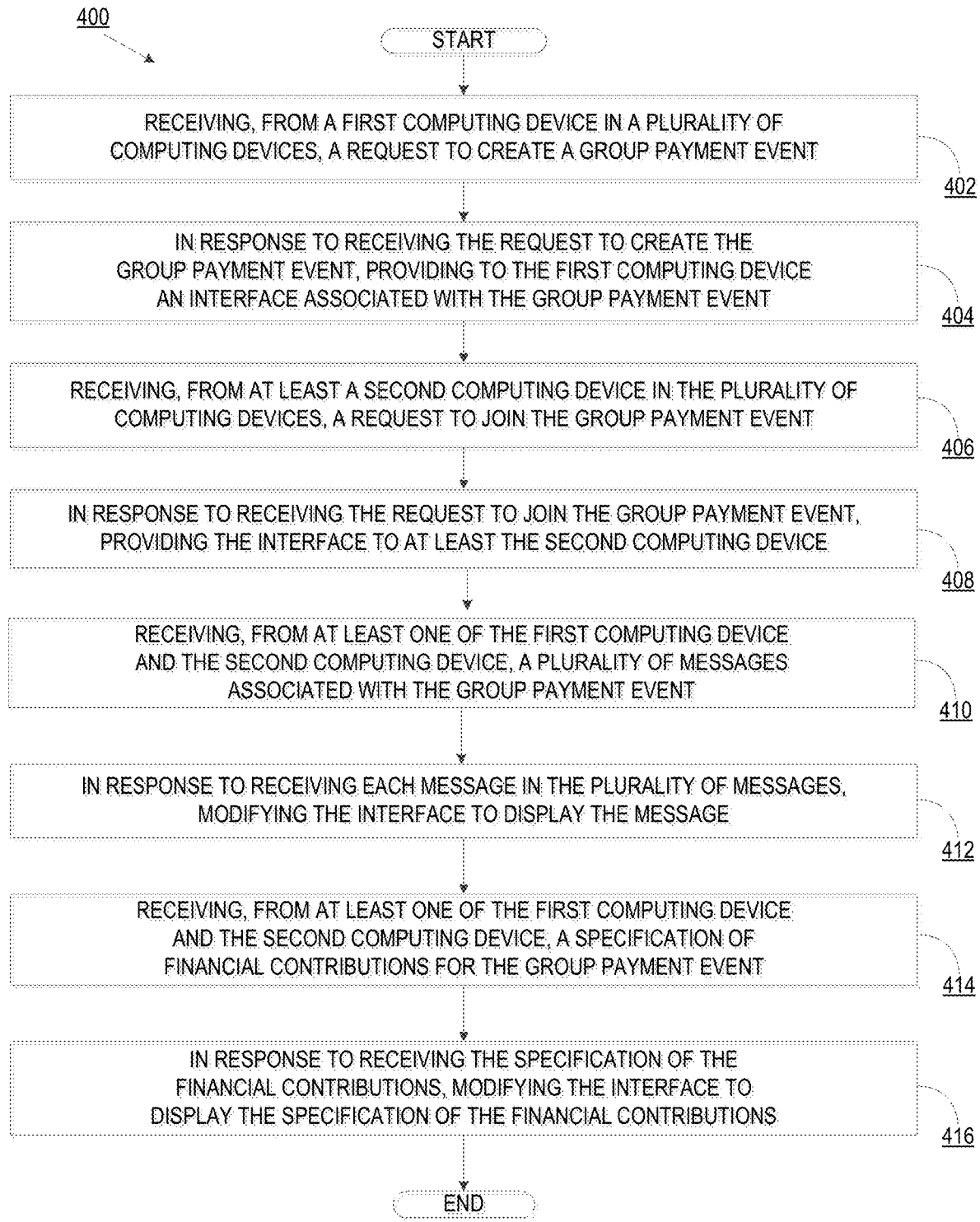
FIG. 4 is a flowchart of an exemplary group payment process, consistent with disclosed embodiments.

FIG. 4 is a flowchart of an exemplary group payment process 400, consistent with disclosed embodiments. Group payment process 400 may be carried out at a group payment system, such as group payment systems 114 and 200 described above.

As shown in FIG. 4, the group payment process 400 may begin at step 402 with a group payment system receiving, from a first computing device in a plurality of computing devices, a request to create a group payment event. The first computing device may, for example, have received the request from a user of the first computing device and transmitted the request to the group payment system. The group payment system may receive the request through, for example, a communication device, such as communication device 202 described above.

The request may include, for example, a name of the group payment event, a date of the group payment event, a budget for the group payment event, and/or a list of guests. In response to receiving the request, the group payment system may configure a group payment event, associating the received information with the group payment event. In some embodiments, the group payment system may send invitations to guests included in the list of guests. For example, the group payment system may send a link (e.g., hyperlink, API, etc.) to a computing device associated with each guest, inviting the guest to join the group payment event, such as by clicking the link. The group payment system may configure the group payment event in other manners as well.

The group payment process 400 continues at step 404 where, in response to receiving the request to create the group payment event, the group payment system provides to the first computing device an interface associated with the group payment event. The group payment system may provide the interface through, for example, a communication device, such as communication device 202 described above. The interface may include, for example, the information received with the request to create the group payment event. The interface may include other information as well.

The first computing device may display the interface. In some embodiments, the interface may be, for instance, an interface associated with a mobile application executing on the first computing device. Other interfaces are possible as well.

At step 406, the group payment system receives, from at least a second computing device in the plurality of computing devices, a request to join the group payment event. The group payment system may receive the request through, for example, a communication device, such as communication device 202 described above. The second computing device may, for example, have received the request from a user of the second computing device and transmitted the request to the group payment system.

In some embodiments, a user associated with the second computing device may have been listed as a guest on a guest list received with the request to create the group payment event, and the second computing device may have received a link (e.g., hyperlink, API, etc.) inviting the second computing device to join the group payment event. In these embodiments. In these embodiments, the request to join the group payment event may comprise a user operating the second computing device to click on the link provided to the second computing device. In other embodiments, the second computing device may send the request without receiving an invitation from the group payment system, such as where a user of the first computing device verbally or otherwise invites the user of the second computing device. The request may be received in other manners as well.

The group payment process continues at step 408 where, in response to receiving the request to join the group payment event, the group payment system provides the interface to at least the second computing device. The group payment system may provide the interface through, for example, a communication device, such as communication device 202 described above. The interface may include, for example, the information received with the request to create the group payment event and/or an indication of the user associated with the first computing device. The interface may include other information as well. Additionally, in some embodiments, the group payment system may provide the interface to other computing devices in the plurality of computing devices as well.

The second computing device may display the interface. In some embodiments, the interface may be, for instance, an interface associated with a mobile application executing on the second computing device. Other interfaces are possible as well.

At step 410, the group payment system receives, from at least one of the first computing device and the second computing device, a plurality of messages associated with the group payment event. The group payment system may receive the message(s) through, for example, a communication device, such as communication device 202 described above. The first and/or second computing device may, for example, have received one or more messages from a user of the computing device and transmitted the message(s) to the group payment system.

The messages may enable users of the computing devices to communicate regarding the group payment event. In particular, the users may discuss any aspect of the group payment event, such as the guest list, the budget, and/or financial contributions for the group payment event. Other messages are possible as well. In particular, the content of the messages is not limited to the group payment event.

The process 400 continues at step 412 where, in response to receiving each message in the plurality of messages, the group payment system modifies the interface to display the message. The group payment system may provide the modified interface to the plurality of computing devices through, for example, a communication device, such as communication device 202 described above. The plurality of computing devices may display the modified interface. In some embodiments, the group payment system may modify the interface to display the entirety of the message. In other embodiments, the group payment system may modify the interface to provide some of, or an indication of, the message, and a user may interact with the interface at a computing device to view the messages. The interface may, for example, display the messages in a message stream format, in which messages appear chronologically. Other arrangements of messages in the interface are possible as well.

At step 414, the group payment system receives, from at least one of the first computing device and the second computing device, a specification of financial contributions for the group payment event. The group payment system may receive the specification through, for example, a communication device, such as communication device 202 described above. The specification may indicate, for example, how much each user associated with a computing device will contribute to the group payment event. In some embodiments, the specification may reflect discussions facilitated by the messages. The specification of the financial contributions may be provided as dollar amounts, goods or services, and/or percentages. Other specifications are possible as well.

The process 400 continues at step 416 where, in response to receiving the specification of the financial contributions, the group payment server modifies the interface to display the specification of the financial contributions. The group payment system may provide the modified interface to the computing devices through, for example, a communication device, such as communication device 202 described above. The plurality of computing devices may display the modified interface. The specification may be displayed using text and/or graphics, and the financial contributions may be listed as, for example, dollar amounts, goods or services, and/or percentages. The specification may be displayed in other manners as well.

Figure 5:
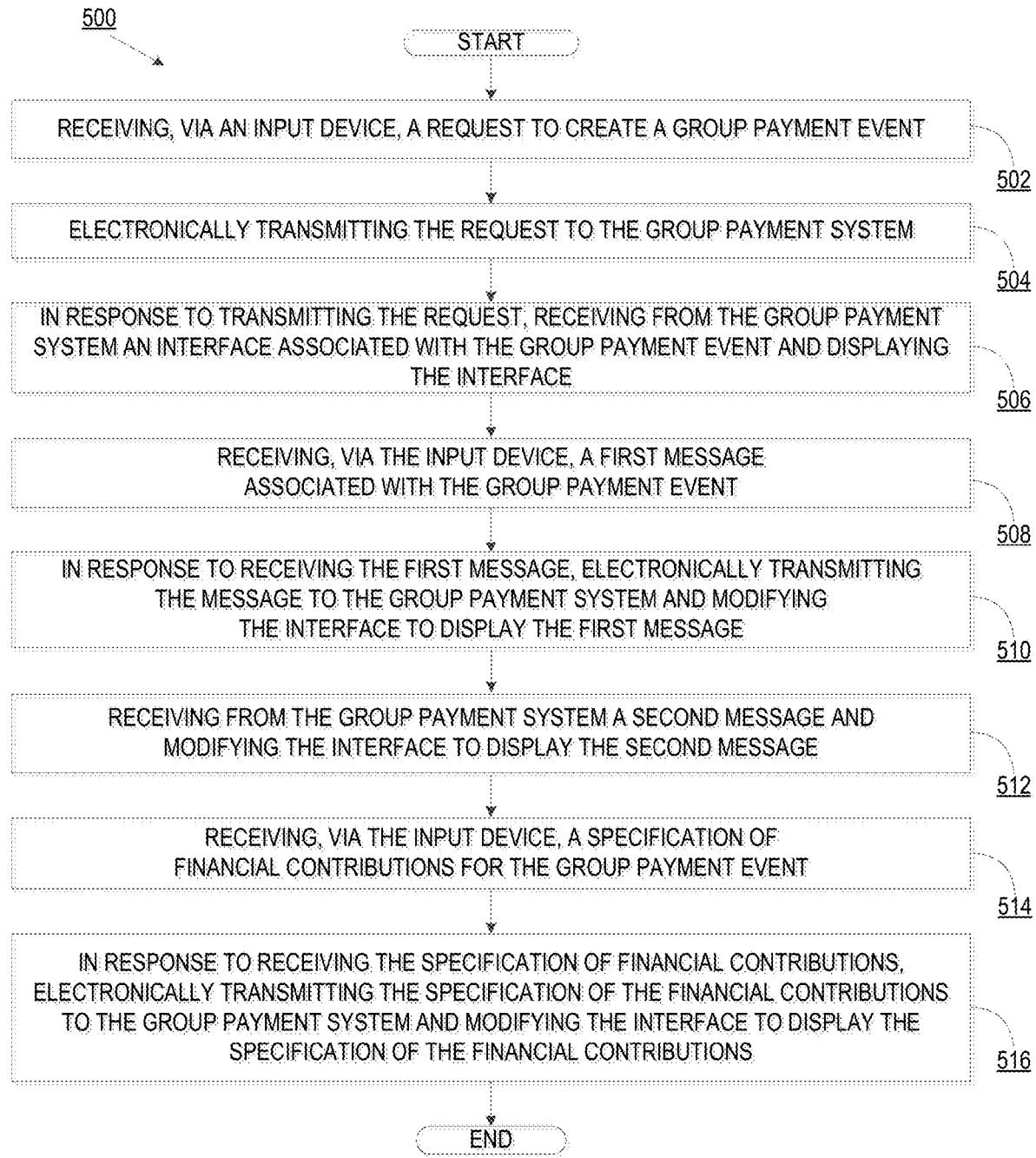
FIG. 5 is a flowchart of another exemplary group payment process, consistent with disclosed embodiments.

FIG. 5 is a flowchart of another exemplary group payment process 500, consistent with disclosed embodiments. Group payment process 500 may be carried out at a computing device, such as computing devices 102, 106, 110 and 300 described above.

As shown in FIG. 5, process 500 begins at step 502 with the computing device receiving, via an input device, a request to create a group payment event. The input device may be, for example, input device 304 described above. The computing device may receive the request from, for example, a user associated with the computing device. The request may include, for example, a name of the group payment event, a date of the group payment event, a budget for the group payment event, and/or a list of guests. The request may include other information as well.

At step 504, the computing device electronically transmits the request to the group payment system. In some embodiments, the computing device may electronically transmit the request through a communication device, such as communication device 302, as described above. The group payment system may be, for example, one of group payment systems 114 and 200 described above. The group payment system, in response to receiving the request, may configure the group payment event.

Process 500 continues at step 506 where, in response to transmitting the request, the computing device receives from the group payment system an interface associated with the group payment event and displays the interface. In some embodiments, the computing device may receive the interface through a communication device, such as communication device 302, as described above. The interface may include, for example, the information received with the request to create the group payment event. The interface may include other information as well.

The computing device may display the interface through, for example, a display device of the computing device, such as display device 306 described above. In some embodiments, the interface may be, for instance, an interface associated with a mobile application executing on the computing device. Other interfaces are possible as well.

At step 508, the computing device may receive, via the input device, a first message associated with the group payment event. The message may be received from, for example, a user associated with the group payment event. In some embodiments, the message may be received through, for instance, a mobile application executing on the computing device. The first message may, for example, be directed to the group payment event. In particular, the first message may discuss any aspect of the group payment event, such as the guest list, the budget, and/or financial contributions for the group payment event. Other messages are possible as well.

Process 500 continues at step 510 where, in response to receiving the first message, the computing device electronically transmits the first message to the group payment system and modifies the interface to display the first message. In some embodiments, the computing device may electronically transmit the first message through a communication device, such as communication device 302, as described above. In some embodiments, the computing device may display the entirety of the first message. In other embodiments, the computing device may provide some of, or an indication of, the message, and the user associated with the computing device may interact with the interface to view the messages. The interface may, for example, display the messages in a message stream format, in which messages appear chronologically. Other arrangements of messages in the interface are possible as well.

At step 512, the computing device receives from the group payment system a second message and modifies the interface to display the second message. The second message may, for example, have been provided by an additional user associated with an additional computing device. In particular, the additional computing device may have received the second message from the additional user and electronically transmitted the second message to the group payment server. The group payment server may have provided the second message to the computing device in the form of the modified interface. The second message may take other forms as well.

At step 514, the computing device receives, via the input device, a specification of financial contributions for the group payment event. The specification may indicate, for example, how much each user included in the group payment event will contribute to the group payment event. In some embodiments, the specification may reflect discussions among users facilitated by the messages. The specification of the financial contributions may be provided as dollar amounts, goods or services, and/or percentages. Other specifications are possible as well.

Process 500 continues at step 516 where, in response to receiving the specification of the financial contributions, the computing device electronically transmits the specification of the financial contributions to modify the interface to display the specification of the financial contributions. In some embodiments, the computing device may electronically transmit the specification through a communication device, such as communication device 302, as described above.

The specification may be displayed using text and/or graphics, and the financial contributions may be listed as, for example, dollar amounts, goods or services, and/or percentages. The specification may be displayed in other manners as well.

Figure 6A:
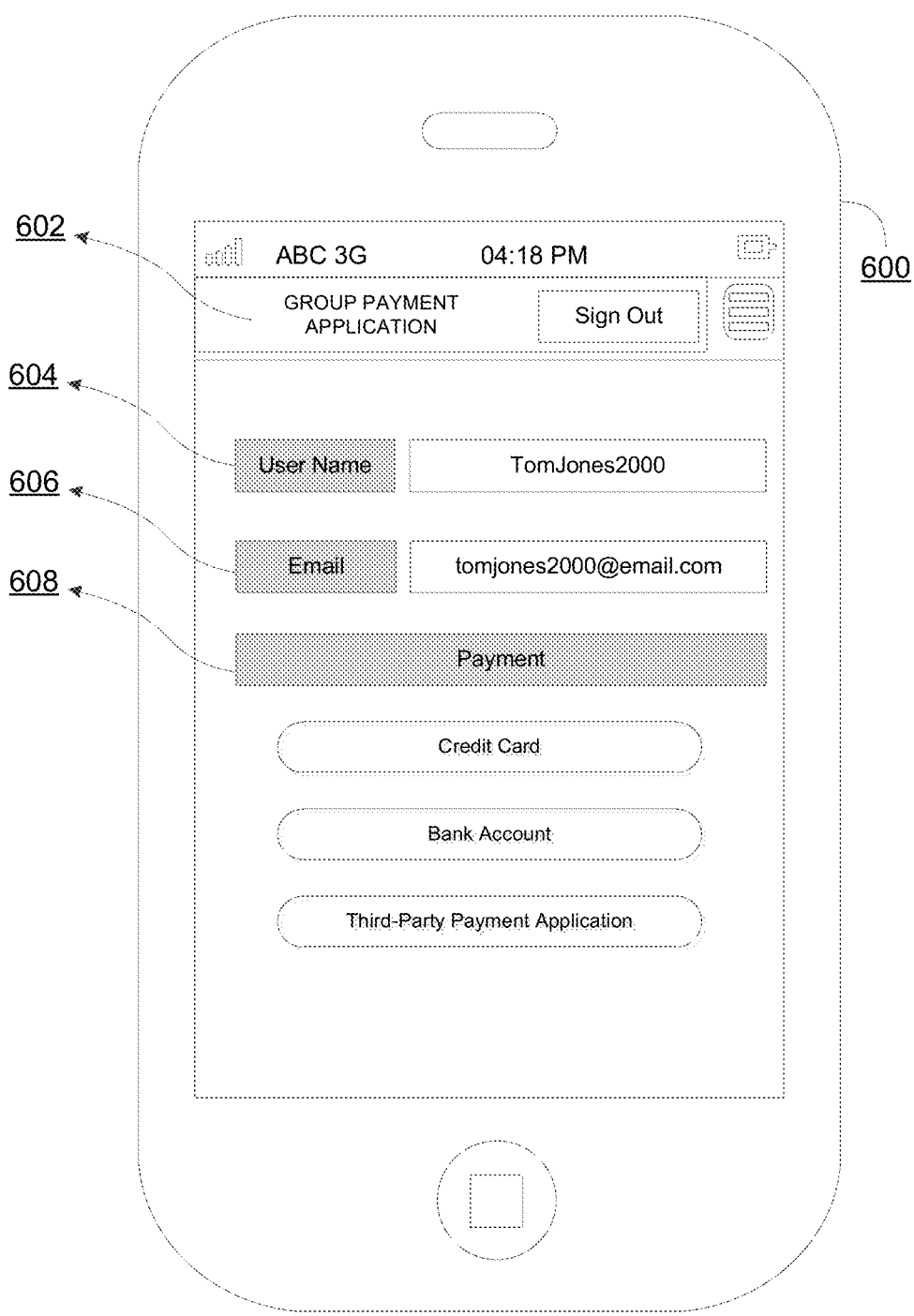
FIGS. 6A-K illustrate exemplary interfaces on computing devices, consistent with disclosed embodiments.

FIGS. 6A-K illustrate exemplary interfaces on computing devices, consistent with disclosed embodiments. As shown in FIG. 6A, in some embodiments the interfaces may be display in a mobile application 602 executed on the computing device 600. The interfaces may be displayed in other manners as well.

An interface may be provided through which a user may register with a group payment system, as shown in FIG. 6A. The interface may include fields into which a user may input registration information, such as a user name 604 and an email address 606. Other registration information is possible as well.

Additionally, the interface may permit the user to select a manner of payment 608. The user may provide payment in many manners. In some embodiments, for example, the user may provide payment through a credit card or bank account. To this end, the group payment system and/or the computing device may be configured to communicate with one or more FSP systems, such as FSP system 116 described above. Alternatively or additionally, the user may provide payment through a third-party payment application. To this end, the group payment system and/or the computing device may be configured to communicate with one or more third-party systems, such as third-party system(s) 118 described above. Still alternatively or additionally, in some embodiments the group payment system may itself be configured to provide a manner of payment. To this end, the group payment system may be configured to provide the facility of one or both of an FSP system and a third-party system. Other manners of payment are possible as well.

Figure 6B:
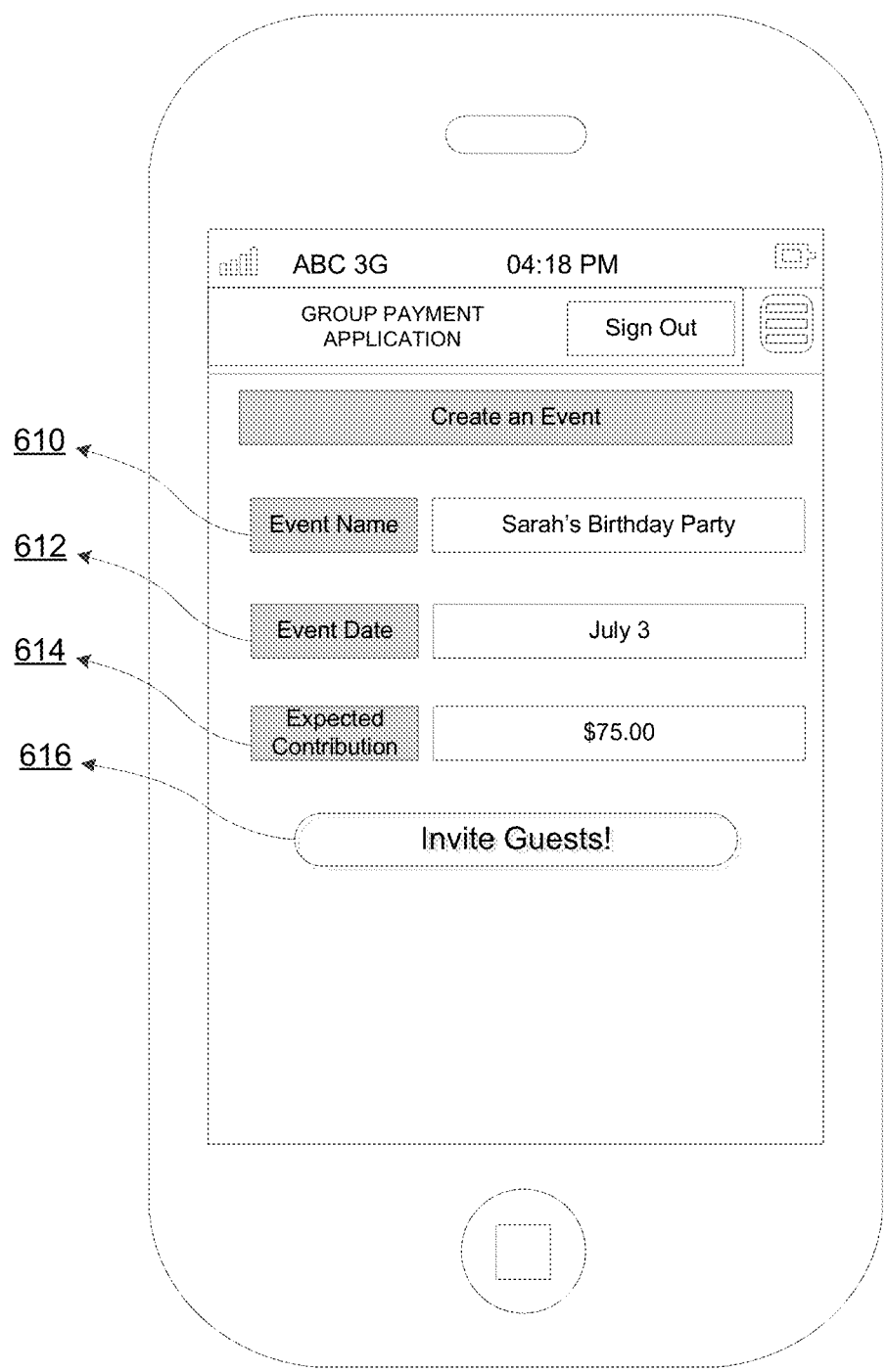

After registering with the group payment system, the user may wish to create a group payment event. An interface through which a user may create a group payment event is shown in FIG. 6B. In some embodiments, the interface may include fields in which a user may input group payment event information, such as an event name 610, an event date 612, and/or an expected contribution 614. The expected contribution may be input as, for example, dollar amounts, goods or services, and/or percentages. Any of the event name 610, event date 612, and expected contribution 6'4 may be input manually and/or selected from suggestions (e.g., of dates, etc.) and/or a list (e.g., of contributions, etc.). Other contributions are possible as well.

Figure 6C:
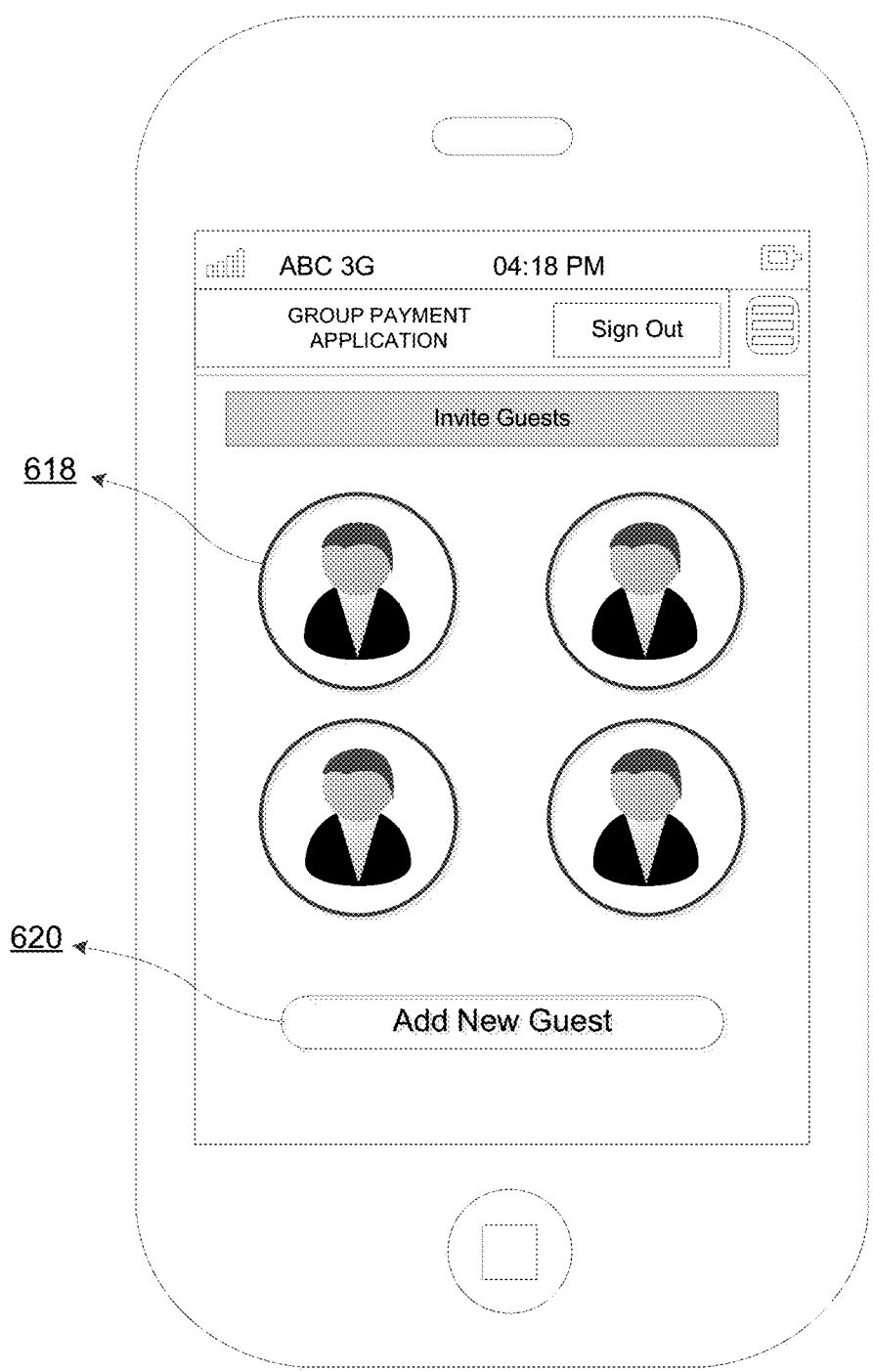

As shown, in some embodiments the interface for creating the group payment may include a guest selection option 616 through which the user may invite guests. Upon selection of guest selection option 616, a guest selection interface may be displayed, as shown in FIG. 6C. The user may select guests from the guest selection interface by, for example, selecting guest icons 618 indicating guests. While the guest icons 618 are shown as images, in some embodiments guest icons 618 may be provided as text, telephone numbers, or in another manner. Additionally, while four guest icons 618 are shown, in some embodiments more or fewer guest icons 618 may be included in the interface. In some embodiments, a user may search for guests among, for instance, the user's contacts stored on the computing device and/or through social media accounts of the user having "friend lists," "connections," etc., stored, for example, by a third-party system 118. A user may select guests in other manners as well.

In some embodiments, a user may select an "add new guest" option 620 to add to the group payment event a guest who has not registered with the group payment system. In some embodiments, upon selection of "add new guest" option 620, the computing device may provide to the group payment system identifying information of the new guest (e.g., phone number, physical address, e-mail address, social network profile, etc.), and the group payment system may send to a computing device (via, e.g., the new guest phone number, e-mail address, etc.) associated with the new guest an invitation (e.g., a hyperlink, API, etc.) to join the group payment event. Alternatively, in some embodiments, upon selection of "add new guest" option 620, the computing device may send to a computing device associated with the new guest an invitation to join the group payment event.

Figure 6D:
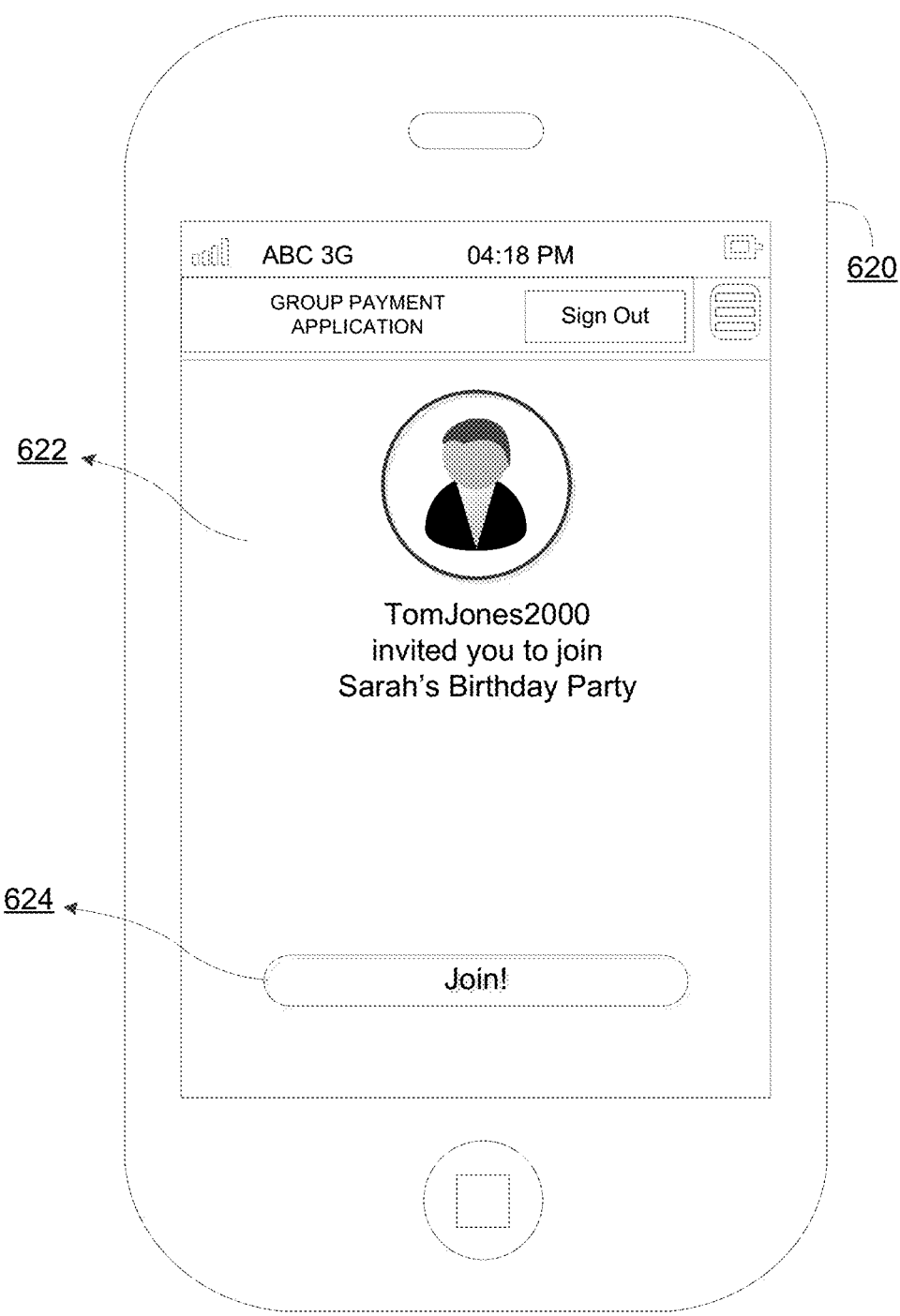

An example invitation 622 to join the group payment event is shown in FIG. 6D. In some embodiments, invitation 622 may be displayed in an interface on computing device 620 associated with the new guest. As shown, the invitation may include a "join" option 624. "Join" option 624 may be, for example, a link (e.g., hyperlink, API, etc.). In some embodiments, upon selecting the link, the new guest may provide to the group payment system a request to join the group payment event. In some embodiments, upon selecting the link, the new guest may be prompted to register and/or provide information to the group payment system. Invitation 622 may take other forms as well.

Figure 6E:
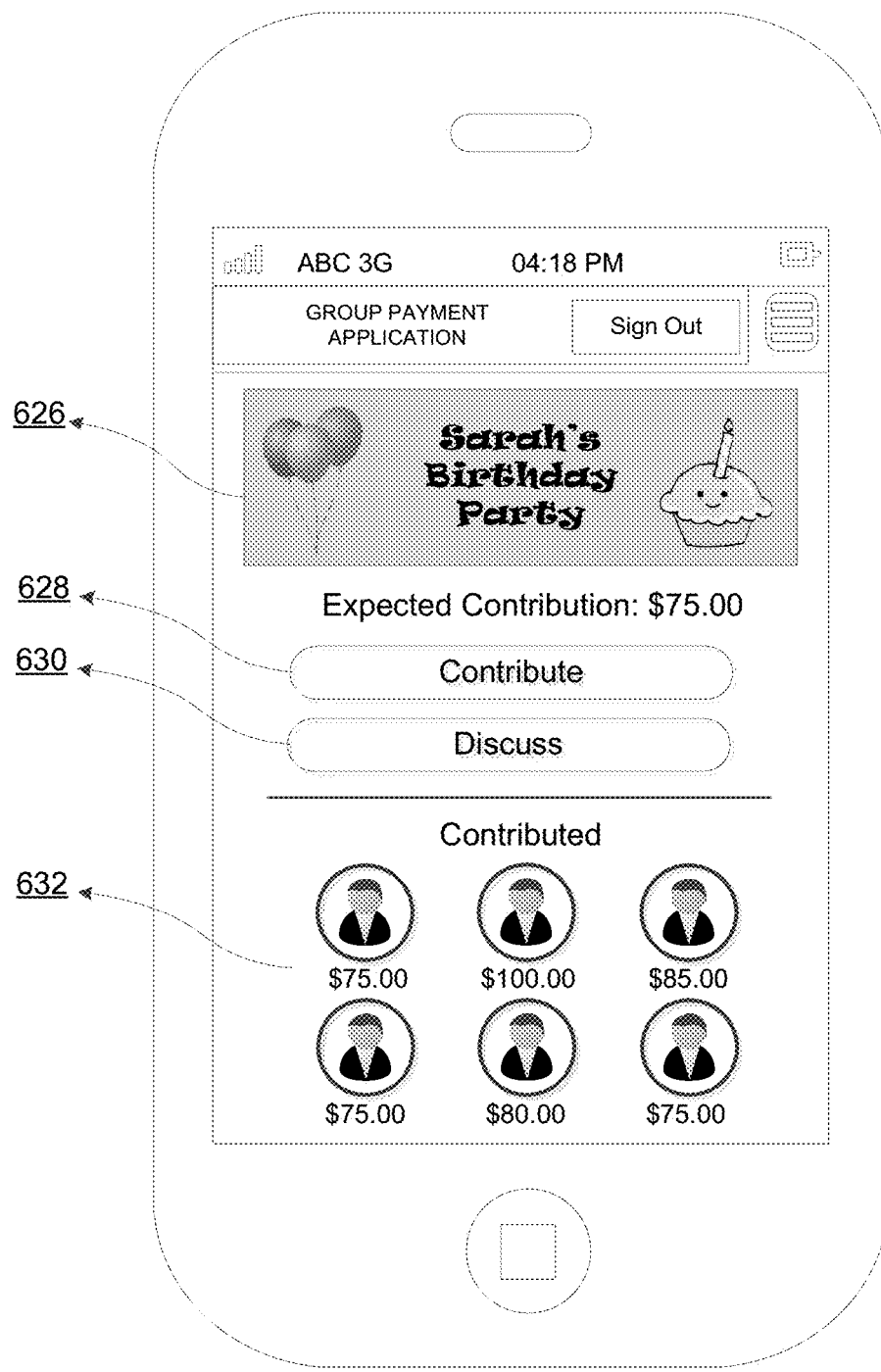

An example interface for a group payment event is shown in FIG. 6E. As shown, the interface may indicate an event name 626 and an expected contribution for the group payment event. In some embodiments, as shown, the interface may further indicate guests who have contributed to the group payment event, as well as the values of the contributions. The interface may further include both a "contribute" option 628 and a "discuss" option 630.

By selecting of "contribute" option 628, a user may make a contribution to the group payment event. For example, in some embodiments, upon selection of "contribute" option 628, the user may select one or both of a contribution amount and a manner of payment. For example, the user may select to make a contribution in the amount of the expected contribution using a bank account provided by the user during registration. Other examples are possible as well.

Figure 6F:
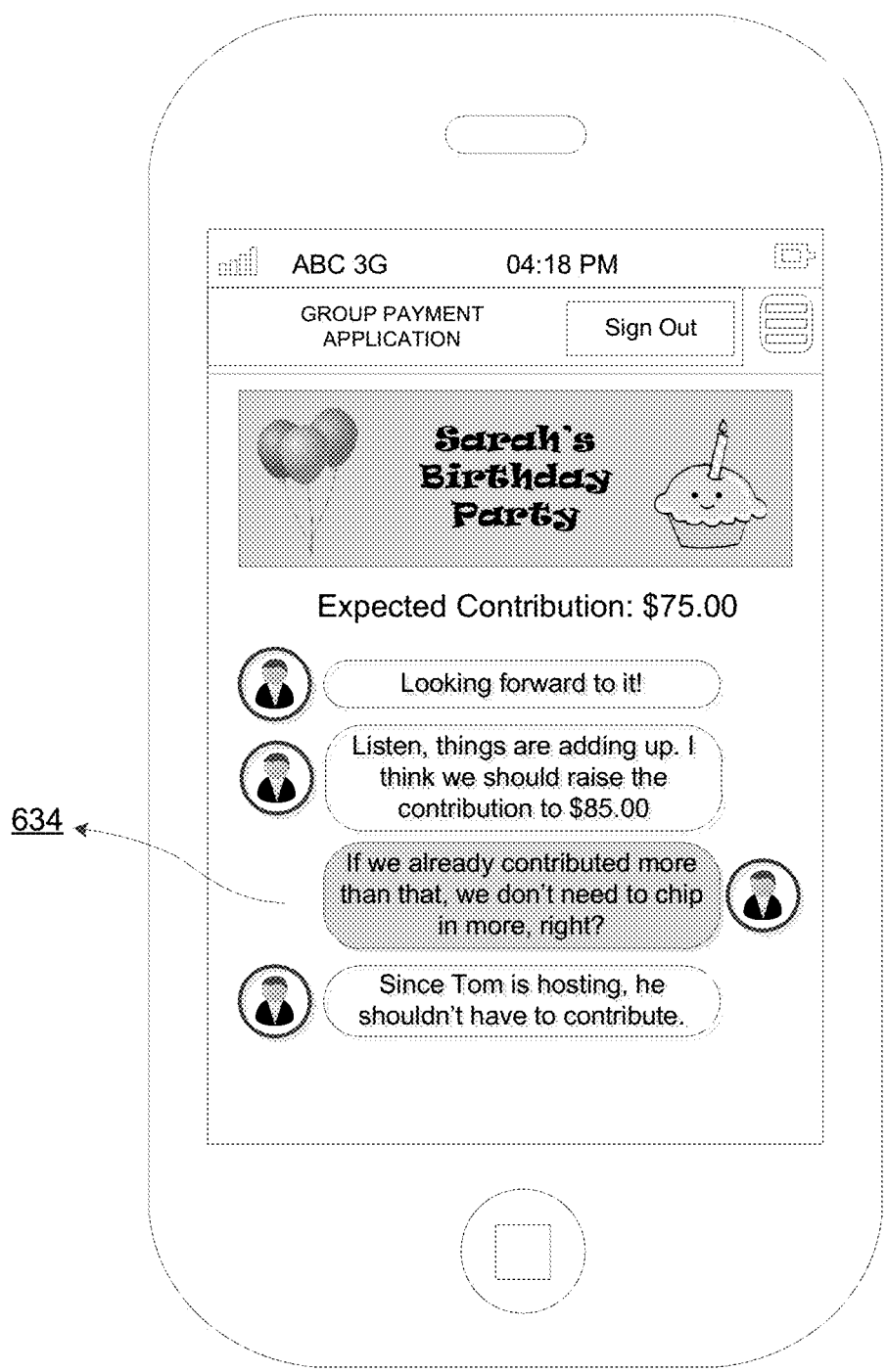

By selecting "discuss" option 630, a user may participate in a discussion among guests of the group payment event, as shown in FIG. 6F. The discussion may include any number of messages 634. In some embodiments, the messages may pertain to the financial contributions of the guests. The messages need not pertain to the financial contributions, however, or even the group payment event. Any messages are possible.

Figure 6G:
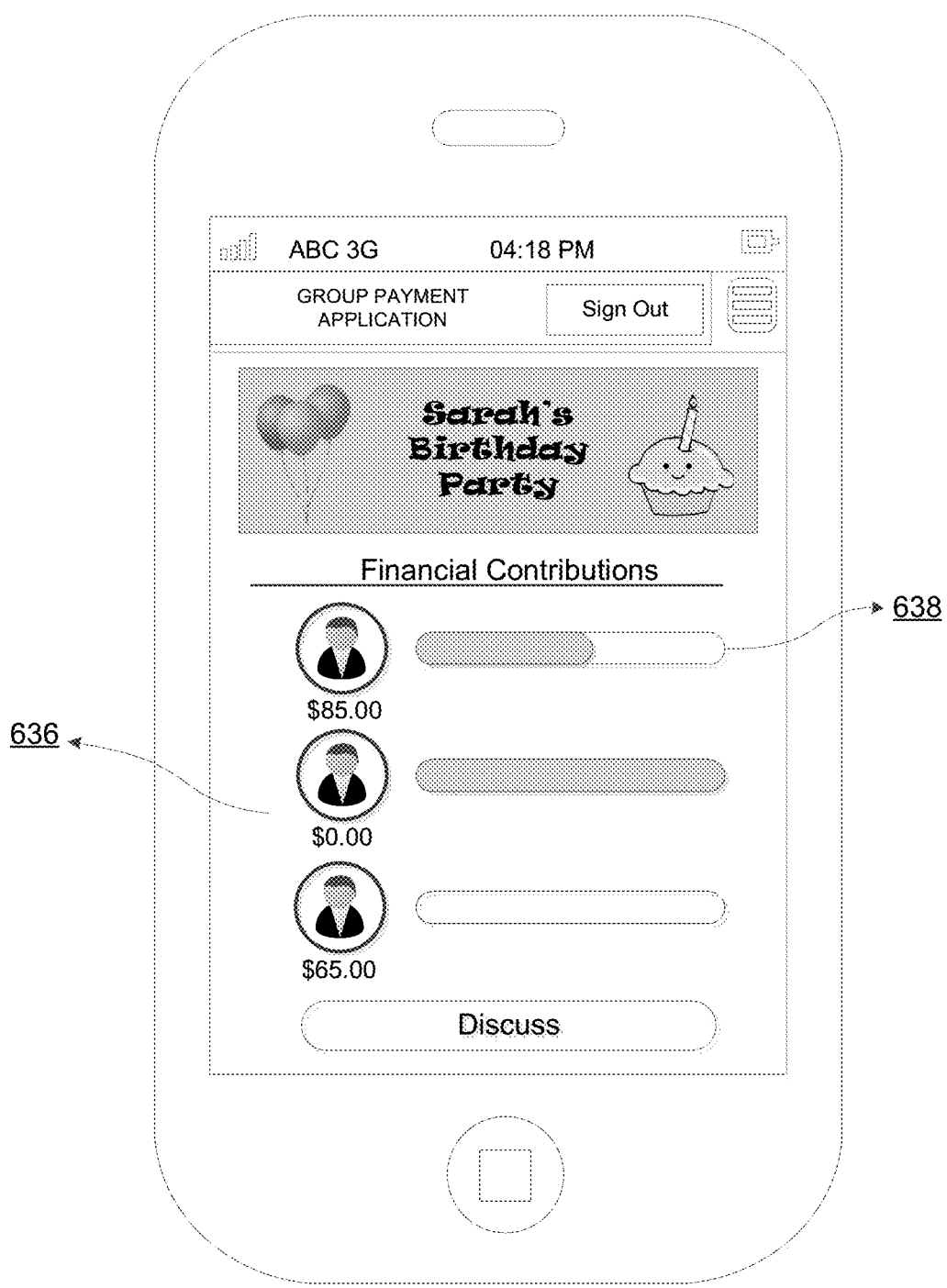

An example interface including a specification of financial contributions 636 by guests is shown in FIG. 6G. In some embodiments, specification of the financial contributions 636 may include dollar amounts of each guests target contributions. Alternatively or additionally, in some embodiments, specification of the financial contributions 636 may include a graphical indication 638 of each guest's target and/or actual financial contribution. The specification of the financial contributions 636 may take other forms as well.

In some embodiments, the financial contributions may be revised, for instance, as a result of discussion in the messages. In these embodiments, a guest may, through a computing device, electronically transmit to the group payment server a specification of revised financial contributions. In response to receiving the specification of the revised financial contributions, the group payment system may modify the interface to replace specification of the financial contributions 636 with the specification of the revised financial contributions, and the computing devices may display the modified interfaces. In some embodiments, the group payment system may poll or otherwise consult the guests of the group payment system before replacing specification of the financial contributions 636 with the specification of the revised financial contributions. Alternatively or additionally, only a creator of the group payment event may replace specification of the financial contributions 636 with the specification of the revised financial contributions. The replacement may be done in other manners as well.

Figure 6H:
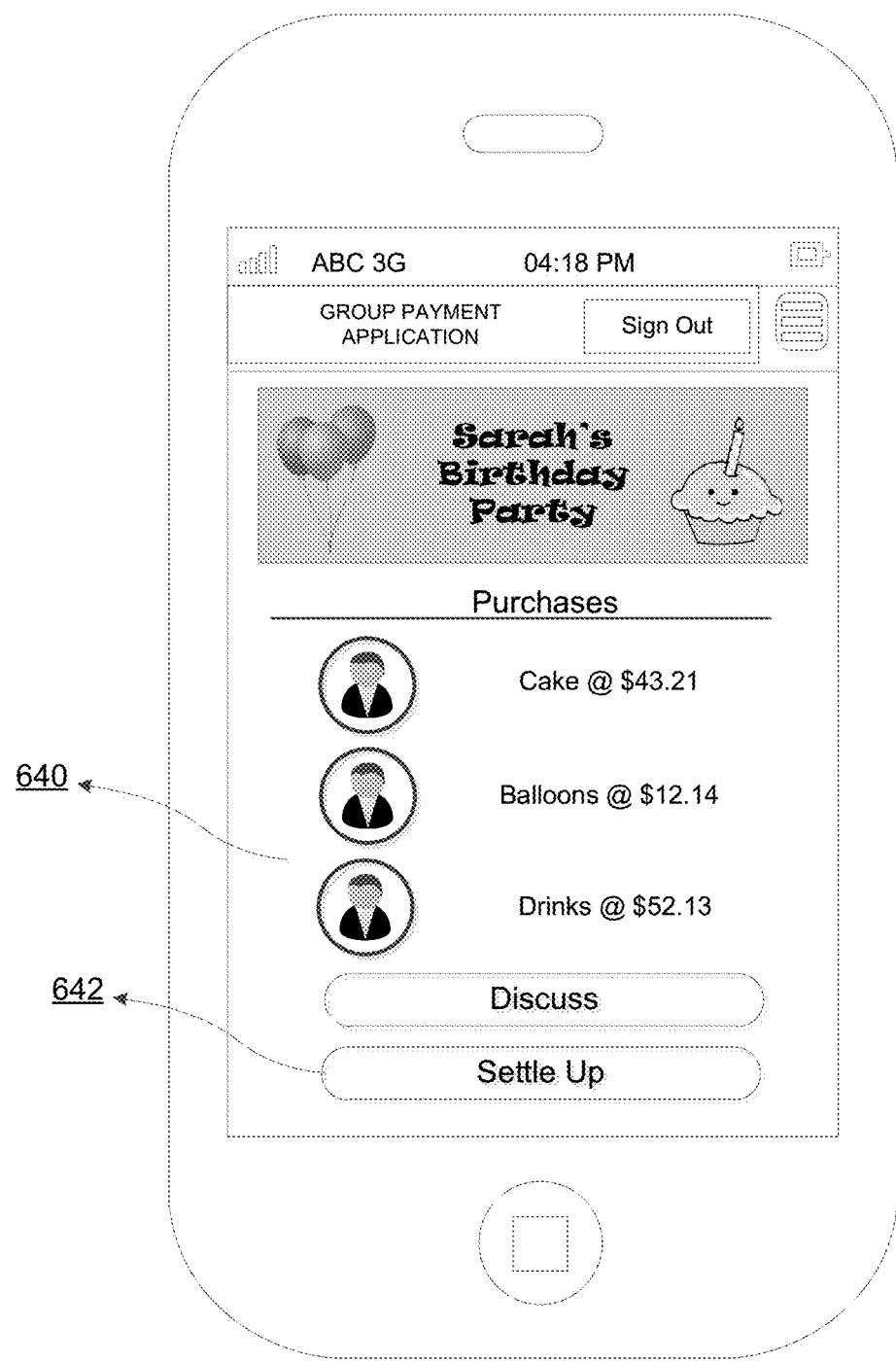

An example interface through which transaction information for purchases related to the group payment event may be displayed is shown in FIG. 6H. In some embodiments, the transaction information may be received by the group payment system from computing devices associated with guests of the group payment event. For example, a guest may enter (e.g., manually, by scanning a receipt, etc.) transaction information for a purchase related to the group payment event into a computing device, and the computing device may provide the transaction information to the group payment system. The group payment system may modify the interface to display the transaction information. As another example, the transaction information may be received by the computing device from an FSP system, such as FSP system 116. In response to the user confirming that the transaction information is for a purchase related to the group payment event, the computing device or the FSP system may provide the transaction information to the group payment system, and the group payment system may modify the interface to display the transaction information. As still another example, the transaction information may be received by the group payment system from the FSP system without interaction by the user or computing device. The transaction information may be received in other manners as well.

Figure 6I:
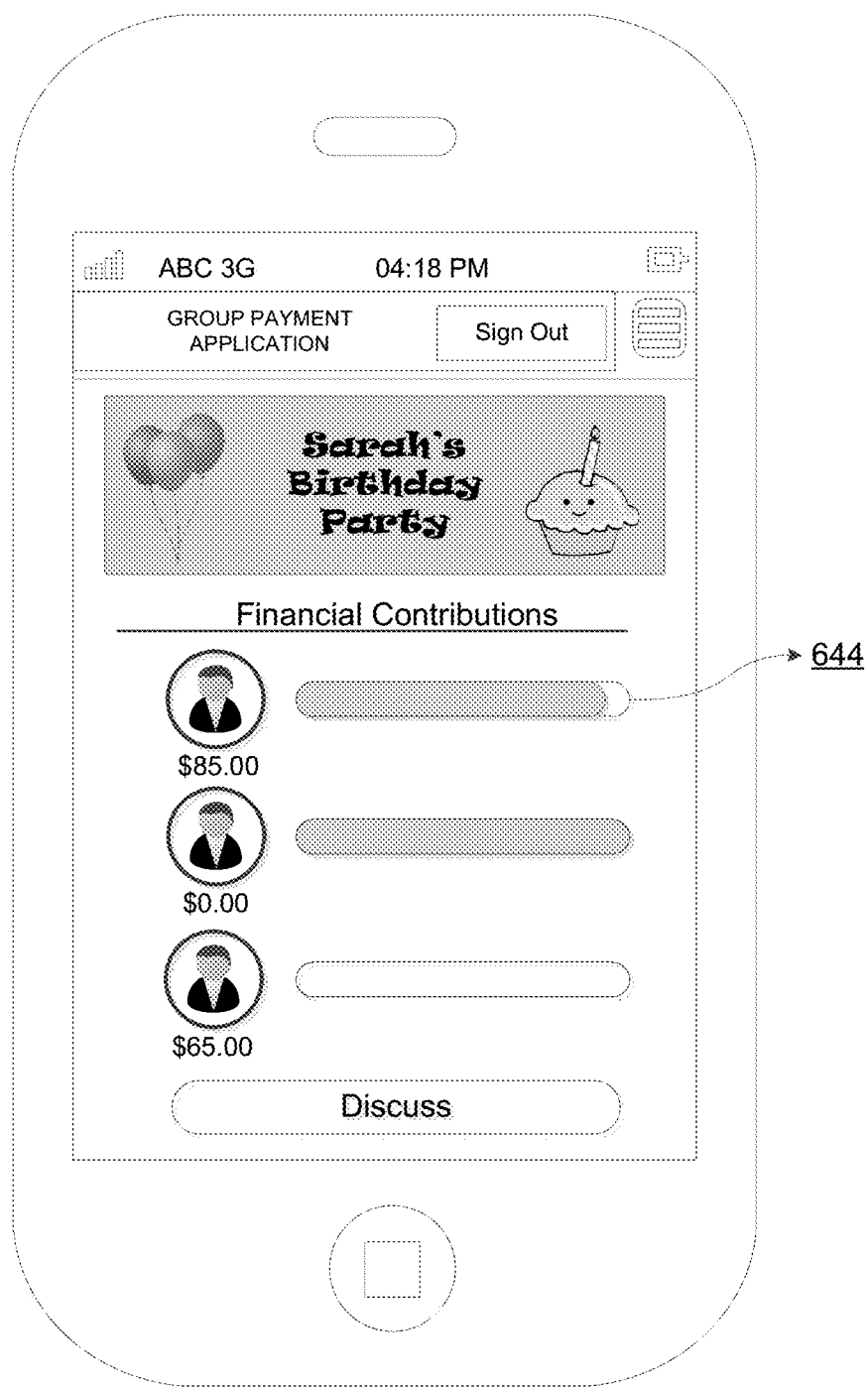

In some embodiments, in response to receiving the transaction information, the group payment server may determine updated financial contributions for the guests. For example, a guest's actual financial contribution 644 may be increased to reflect a purchase made by the guest, as shown in FIG. 6I. As another example, other guests' target financial contributions may be increased to reflect the purchase made by the guest. Other examples are possible as well. In general, the interface may be modified to display the updated financial contributions.

Figure 6J:
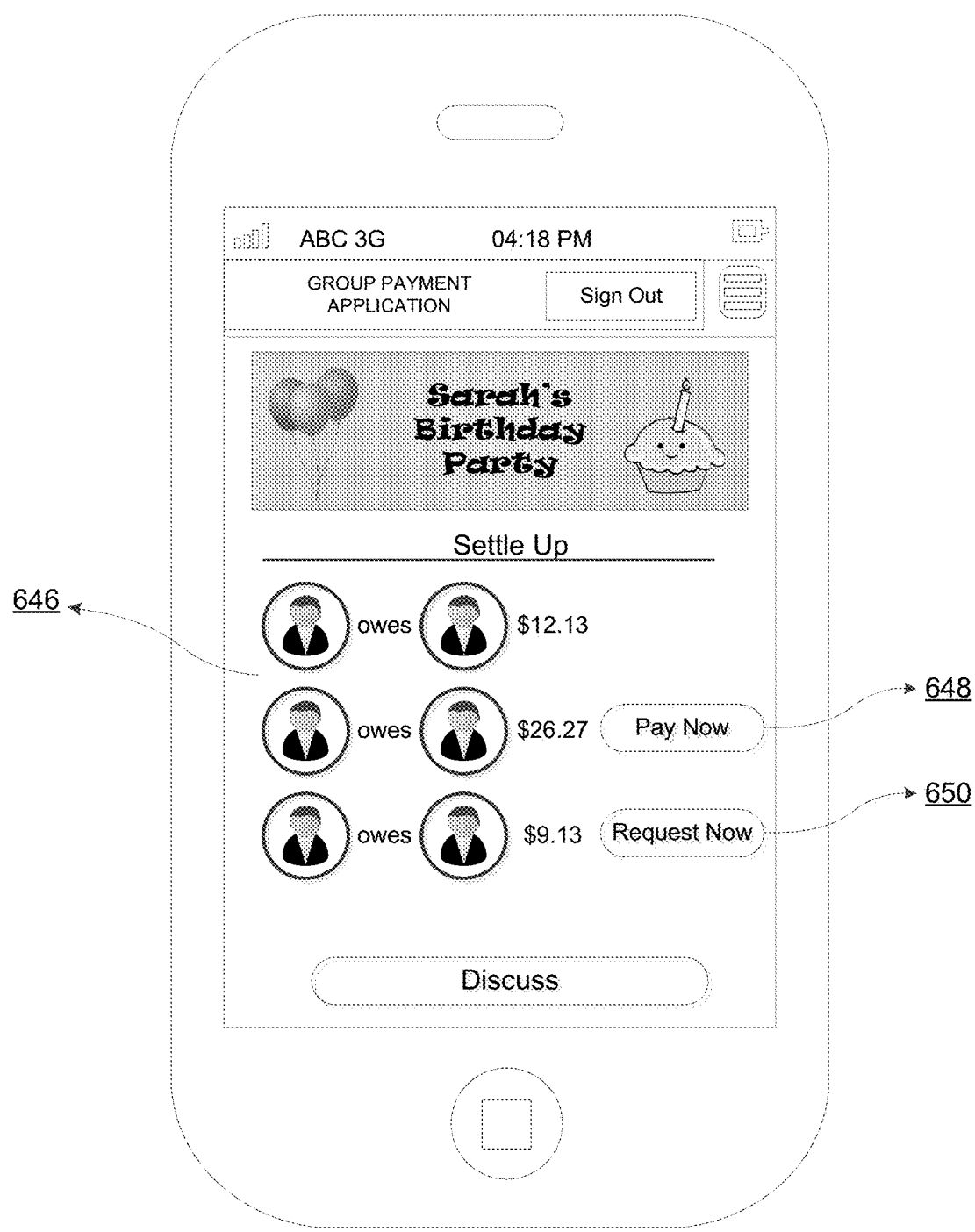

Returning to FIG. 6H, the interface may further provide a "settle up" option 642, through which guests of the group payment event may reconcile their financial contributions to the group payment event. An example interface for settling a group payment event is shown in FIG. 6J. In some embodiments, guest-to-guest transactions 646 may be provided. Guest-to-guest transactions 646 may, for example, reflect the minimum number of financial exchanges through which the group payment event may be settled. Other guest-to-guest transactions 646 are possible as well.

In some embodiments, the interface may include a "pay now" option 648 for guest-to-guest transaction(s) 646 in which the user owes money to another guest. By selecting the "pay now" option 648, the user may make a payment to the other guest, e.g., in any of the payment manners described above. Alternatively or additionally, in some embodiments the interface may include a "request now" option 650 for guest-to-guest transaction(s) 646 in which the user is owed money by another guest. By selecting "request now" option 650, the user may request a payment from the other guest, e.g., in any of the payment manners described above. In some embodiments, the group payment system may be configured to facilitate and/or provide notifications regarding such payments and requests for payment.

When a user makes a payment to or receives a payment from another guest, a notification of the payment may be sent to the group payment system. In response to receiving the notification of payment, the group payment server may determine updated financial contributions. For example, if the user has made a payment to another guest, the user's financial contribution may be increased and the other guest's financial contribution may be decreased. As another example, if the user has received a payment from another guest, the user's financial contribution may be decreased and the other guest's financial contribution may be increased. The updated financial contributions may be determined in other manners as well.

Figure 6K:
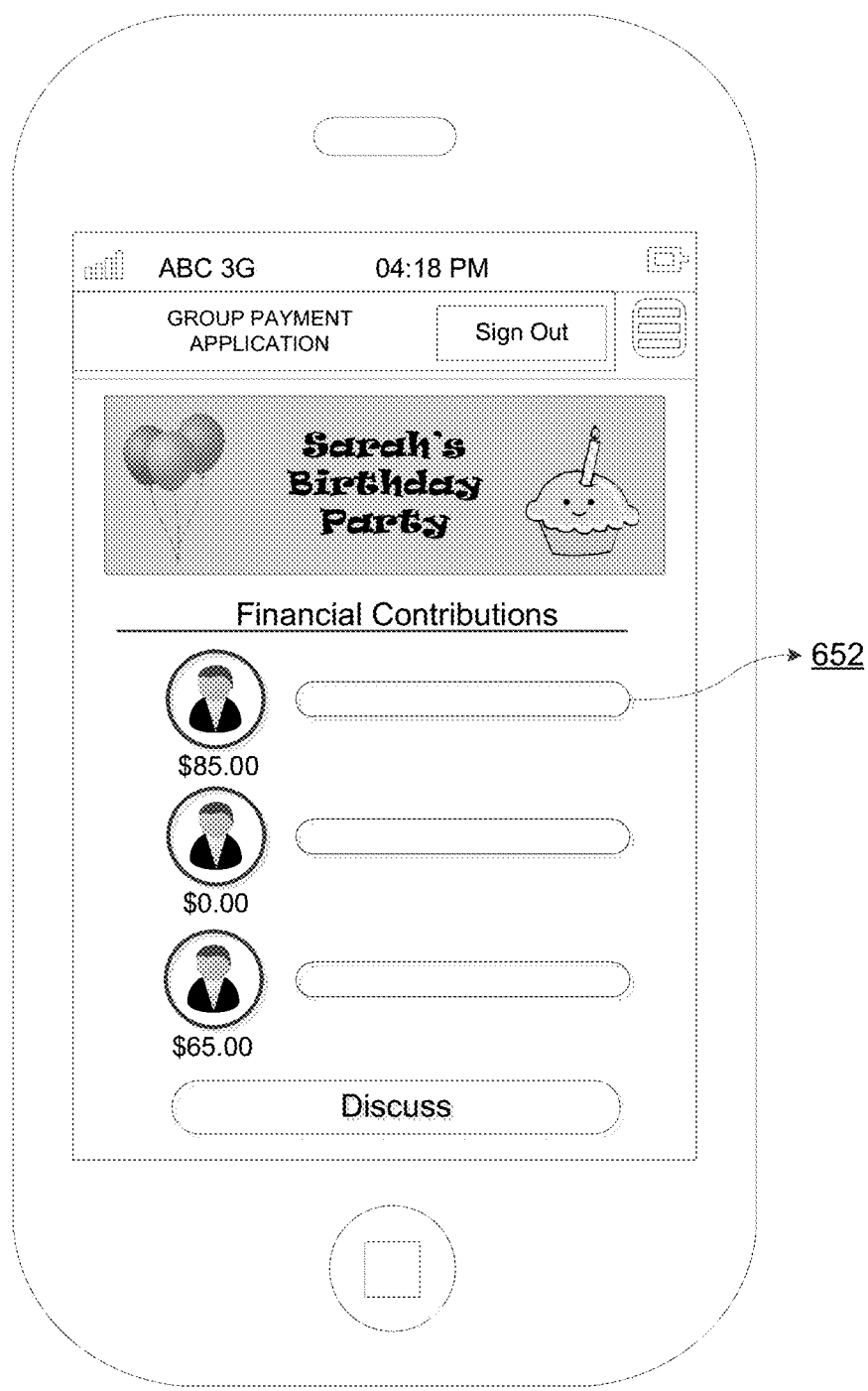

The group payment server may modify the interface to display the updated financial contributions, as shown in FIG. 6K. In some embodiments, as shown, the updated financial contributions may be displayed by modifying the actual financial contributions 652. The updated financial contributions may be displayed in other manners as well.

While several example interfaces are shown in FIGS. 6A-K, it will be understood that the interfaces shown are merely examples and that other interfaces are possible as well.

Further, while the foregoing examples focused on a group payment event occurring in the future, it will be understood that similar group payment systems, computing devices, processes, and interfaces may be used to facilitate group payment of an event that occurred in the past as well. For example, a group payment event may be created reflecting a meal shared by guests at a restaurant, and the financial contributions, transaction information, and payments associated with the meal may be provided, displayed, and settled as described above. Other examples are possible as well.

Additionally, while the foregoing examples focused on mobile computing devices executing a mobile application, it will be understood that similar group payment systems, processes, and interfaces may be used to facilitate group payment with computing devices providing access to a web platform and email.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A group payment system, comprising:
a communication device configured to communicate with a plurality of computing devices;
a memory storing instructions; and
one or more processors configured to execute the instructions to perform operations comprising:
receiving, from a first computing device in the plurality of computing devices, a request to create a group payment event;
in response to receiving the request to create the group payment event, generating for display on the first computing device an event creation page, the event creation page comprising input fields for group payment event information, including an event name, an event date, and an expected contribution;
receiving, from the first computing device, a request to invite guests based on user inputs for the event name, the event date, and the expected contribution;
in response to receiving the request to invite guests, generating for display on the first computing device a guest selection page, the guest selection page comprising guests icon associated with guests, a search input field, and an input to add a new guest to the group payment system;
receiving, from at least a second computing device in the plurality of computing devices, a request to join the group payment event, wherein the request to join the group payment event is based on an invitation based on user inputs to the guest selection page;
in response to receiving the request to join the group payment event, generating for display, on the second computing device of the plurality of computing devices, a group payment event page, wherein the group payment event page includes the event name, the expected contribution, and values of the contribution made by each guest;

receiving, from at least one of the first or second computing devices, a plurality of messages associated with the group payment event;

in response to receiving a message of the plurality of messages, generating for display, on the first and second computing devices, the message;

receiving, from at least one of the first or second computing devices, a specification of financial contributions for the group payment event;

in response to receiving the specification of the financial contributions, generating for display the specification of the financial contributions on the first and second computing devices;

receiving, from the second computing device, a proposed specification of revised financial contributions;

polling the first and second computing devices as to whether the proposed specification of revised financial contributions is acceptable;

in response to receiving an indication from the first computing device that the proposed specification of the revised financial contributions is acceptable, modifying the specification of the financial contributions with a specification of the revised financial contributions; and in response to receiving an indication from the first computing device that the proposed specification of the revised financial contributions is not acceptable, rejecting the proposed specification of revised financial contributions.

2. The group payment system of claim 1, wherein the operations further comprise:

receiving transaction information for a purchase related to the group payment event; and in response to receiving the transaction information, indicating the transaction information.

3. The group payment system of claim 2, wherein the operations further comprise, in response to receiving the transaction information;

determining updated financial contributions; and generating for display the updated financial contributions.

4. The group payment system of claim 2, wherein receiving the transaction information comprises receiving the transaction information from one of the first or second computing devices.

5. The group payment system of claim 2, wherein:

the communication device is configured to communicate with a financial service provider; and receiving the transaction information comprises receiving the transaction information from the financial service provider.

6. The group payment system of claim 2, further comprising:

displaying, based on the received transaction information, financial contributions of each user of the group payment event.

7. The group payment system of claim 6, wherein the financial contributions of each user are displayed relative to a target contribution.

8. The group payment system of claim 2, wherein the received transaction information comprises an electronic funds transfer from a financial service account.

9. The group payment system of claim 8, wherein the electronic funds transfer is facilitated by a third-party system communicatively coupled to the group payment system and the financial service account.

10. The server of claim 1, wherein the operations further comprise:

receiving a notification of payment by a first user associated with the first computing device to a second user associated with the second computing device; and in response to receiving the notification of payment;

determining updated financial contributions; and generating for display the updated financial contributions.

11. The group payment system of claim 1, wherein the operations further comprise:

receiving, from at least one of the first or second computing devices, a request to join a communication thread; and in response to receiving the request to join the communication thread, generating for display the communication thread.

12. The group payment system of claim 11, wherein the operations further comprise, providing the communication thread to at least one of the computing devices.

13. A method comprising:

receiving, from a first computing device in a plurality of computing devices, a request to create a group payment event;

in response to receiving the request to create the group payment event, generating for display on the first computing device an event creation page, the event creation page comprising input fields for group payment event information, including an event name, an event date, and an expected contribution;

receiving, from the first computing device, a request to invite guests based on user inputs for the event name, the event date, and the expected contribution;

in response to receiving the request to invite guests, generating for display on the first computing device a guest selection page, the guest selection page comprising guests icon associated with guests, a search input field, and an input to add a new guest to the group payment system;

receiving, from at least a second computing device in the plurality of computing devices, a request to join the group payment event, wherein the request to join the group payment event is based on an invitation based on user inputs to the guest selection page;

in response to receiving the request to join the group payment event, generating for display, on the second computing device of the plurality of computing devices, a group payment event page, wherein the group payment event page includes the event name, the expected contribution, and values of the contribution made by each guest;

receiving, from at least one of the first or second computing devices, a plurality of messages associated with the group payment event;

in response to receiving a message of the plurality of messages, modifying the first and second interfaces to display the at least one message;

receiving, from at least one of the first or second computing devices, a specification of financial contributions for the group payment event;

in response to receiving the specification of the financial contributions, generating for display the specification of the financial contributions on the first and second computing devices;

receiving, from the second computing device, a proposed specification of revised financial contributions;

polling the first and second computing devices as to whether the proposed specification of revised financial contributions is acceptable;

in response to receiving an indication from the first computing device that the proposed specification of the revised financial contributions is acceptable, modifying the specification of the financial contributions with a specification of the revised financial contributions; and in response to receiving an indication from the first computing device, that the proposed specification of the revised financial contributions is not acceptable, rejecting the proposed specification of revised financial contributions.

14. The method of claim 13, further comprising:
receiving transaction information for a purchase related to the group payment event; and
in response to receiving the transaction information, indicating the transaction information.

15. The method of claim 14, further comprising, in response to receiving the transaction information:
determining updated financial contributions; and
generating for display the updated financial contributions.

16. The method of claim 14, wherein receiving the transaction information comprises receiving the transaction information from one of the first or second computing devices.

17. The method of claim 14, wherein receiving the transaction information comprises receiving the transaction information from a financial service provider.

18. The method of claim 13, further comprising:
receiving a notification of payment by a first user associated with the first computing to a second user associated with the second computing device; and
in response to receiving the notification of payment:
determining updated financial contributions; and
generating for display the updated financial contributions.

* * * * *